United States Patent
Czaplicki et al.

(10) Patent No.: US 6,523,884 B2
(45) Date of Patent: *Feb. 25, 2003

(54) HYDROFORM STRUCTURAL REINFORCEMENT SYSTEM

(75) Inventors: Michael J. Czaplicki, Rochester, MI (US); Jon P. Riley, Farmington, MI (US); Eric Brennecke, Troy, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/132,482

(22) Filed: Apr. 25, 2002

(65) Prior Publication Data

US 2002/0125739 A1 Sep. 12, 2002

Related U.S. Application Data

(63) Continuation of application No. 09/676,335, filed on Sep. 29, 2000.

(51) Int. Cl.[7] .................................................. B60J 7/00
(52) U.S. Cl. ........................ 296/188; 296/187; 296/901; 52/735.1; 52/309.09
(58) Field of Search ................................. 296/188, 187, 296/189, 203.02, 203.03, 209, 901; 428/36.5, 613; 52/735.1, 309.8, 309.09, 309.66; 156/333

(56) References Cited

U.S. PATENT DOCUMENTS

| | | |
|---|---|---|
| 1,814,677 A | 7/1931 | Fennema |
| 3,054,636 A | 9/1962 | Wessells, III |
| 3,123,170 A | 3/1964 | Bryant |
| 3,493,257 A | 2/1970 | Fitzgerald et al. |
| 3,649,375 A | 3/1972 | Venkatesan |
| 3,665,968 A | 5/1972 | DePutter |
| 3,746,387 A | 7/1973 | Schwenk |
| 3,757,559 A | 9/1973 | Welsh |

(List continued on next page.)

FOREIGN PATENT DOCUMENTS

| | | |
|---|---|---|
| DE | 2919046 | 5/1979 |
| DE | 3627725 A1 | 2/1988 |
| DE | 9011147.8 | 9/1990 |
| DE | 40 28 895 C1 | 2/1992 |

(List continued on next page.)

OTHER PUBLICATIONS

Co-pending Application Ser. No. 09/524,960, filed Mar. 14, 2000.
Co-pending Application Ser. No. 09/524,961; filed Mar. 14, 2000.
Co-pending Application Serial No. 09/591,877, filed Jun. 12, 2000.

(List continued on next page.)

Primary Examiner—Kiran Patel
(74) Attorney, Agent, or Firm—Dobrusin & Thennisch PC

(57) ABSTRACT

An structural reinforcement system for use with hydroforms and other closed forms having a plurality of members designed to be secured to a closed form, such as an hydroform tube used in automotive applications. A bonding material, such as an epoxy-based reinforcing foam, is disposed on at least a portion of the outer surface of each of the plurality of members. Once the system is attached to the closed form, the foam expands and cures during an automobile assembly operation, bonding the reinforcement system to the hydroform tube and the members. As a result, the reinforcement system provides enhanced load distribution over the vehicle frame without adding excessive weight and further serves to reduce noise and vibrational characteristics of the automotive vehicle.

20 Claims, 2 Drawing Sheets

U.S. PATENT DOCUMENTS

| | | |
|---|---|---|
| 3,890,108 A | 6/1975 | Welsh |
| 4,019,301 A | 4/1977 | Fox |
| 4,029,128 A | 6/1977 | Yamagishi |
| 4,082,825 A | 4/1978 | Puterbaugh |
| 4,083,384 A | 4/1978 | Horne et al. |
| 4,090,734 A | 5/1978 | Inami et al. |
| 4,238,540 A | 12/1980 | Yates et al. |
| 4,378,395 A | 3/1983 | Asoshina et al. |
| 4,397,490 A | 8/1983 | Evans et al. |
| 4,440,434 A | 4/1984 | Celli |
| 4,457,555 A | 7/1984 | Draper |
| 4,463,870 A | 8/1984 | Coburn, Jr. et al. |
| 4,559,274 A | 12/1985 | Kloppe et al. |
| 4,610,836 A | 9/1986 | Wycech |
| 4,613,177 A | 9/1986 | Loren et al. |
| 4,695,343 A | 9/1987 | Wycech |
| 4,705,716 A | 11/1987 | Tang |
| 4,732,806 A | 3/1988 | Wycech |
| 4,751,249 A | 6/1988 | Wycech |
| 4,762,352 A | 8/1988 | Enomoto |
| 4,769,391 A | 9/1988 | Wycech |
| 4,803,108 A | 2/1989 | Leuchten et al. |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,898,630 A | 2/1990 | Kitoh et al. |
| 4,901,395 A | 2/1990 | Semrau |
| 4,901,500 A | 2/1990 | Wycech |
| 4,908,930 A | 3/1990 | Wycech |
| 4,917,435 A | 4/1990 | Bonnett et al. |
| 4,922,596 A | 5/1990 | Wycech |
| 4,923,902 A | 5/1990 | Wycech |
| 4,946,737 A | 8/1990 | Lindeman et al. |
| 4,978,562 A | 12/1990 | Wycech |
| 4,984,406 A | 1/1991 | Friesen |
| 4,989,913 A | 2/1991 | Moore, III |
| 4,995,545 A | 2/1991 | Wycech |
| 5,040,803 A | 8/1991 | Cieslik et al. |
| 5,072,952 A | 12/1991 | Irrgeher et al. |
| 5,102,188 A | 4/1992 | Yamane |
| 5,122,398 A | 6/1992 | Seiler et al. |
| 5,124,186 A | 6/1992 | Wycech |
| 5,213,391 A | 5/1993 | Takagi |
| 5,255,487 A | 10/1993 | Wieting et al. |
| 5,266,133 A | 11/1993 | Hanley et al. |
| 5,344,208 A | 9/1994 | Bien et al. |
| 5,358,397 A | 10/1994 | Ligon et al. |
| 5,373,027 A | 12/1994 | Hanley et al. |
| 5,382,397 A | 1/1995 | Turner, Jr. |
| 5,395,135 A | 3/1995 | Lim et al. |
| 5,506,025 A | 4/1996 | Otto et al. |
| 5,560,672 A | 10/1996 | Lim et al. |
| 5,575,526 A | 11/1996 | Wycech |
| 5,577,784 A | 11/1996 | Nelson |
| 5,580,120 A | 12/1996 | Nees et al. |
| 5,642,914 A | 7/1997 | Takabatake |
| 5,648,401 A | 7/1997 | Czaplicki et al. |
| 5,649,400 A | 7/1997 | Miwa |
| 5,652,039 A | 7/1997 | Tremain et al. |
| 5,660,116 A | 8/1997 | Dannawi et al. |
| 5,707,098 A | 1/1998 | Uchida et al. |
| 5,725,272 A | 3/1998 | Jones |
| 5,731,069 A | 3/1998 | Delle Donne et al. |
| 5,755,486 A | 5/1998 | Wycech |
| 5,766,719 A | 6/1998 | Rimkus |
| 5,785,376 A | 7/1998 | Nees et al. |
| 5,786,394 A | 7/1998 | Slaven |
| 5,803,533 A | 9/1998 | Schulz et al. |
| 5,804,608 A | 9/1998 | Nakazato et al. |
| 5,806,915 A | 9/1998 | Takabatake |
| 5,806,919 A | 9/1998 | Davies |
| 5,819,408 A | 10/1998 | Catlin |
| 5,851,626 A | 12/1998 | McCorry et al. |
| 5,855,094 A | 1/1999 | Baudisch et al. |
| 5,866,052 A | 2/1999 | Muramatsu |
| 5,871,849 A | 2/1999 | Lepine |
| 5,878,784 A | 3/1999 | Sales et al. |
| 5,884,960 A | 3/1999 | Wycech |
| 5,885,688 A | 3/1999 | McLaughlin |
| 5,888,600 A | 3/1999 | Wycech |
| 5,888,642 A | 3/1999 | Meteer et al. |
| 5,894,071 A | 4/1999 | Merz et al. |
| 5,901,528 A | 5/1999 | Richardson |
| 5,901,752 A | 5/1999 | Lundman |
| 5,902,656 A | 5/1999 | Hwang |
| 5,904,024 A | 5/1999 | Miwa |
| 5,932,680 A | 8/1999 | Heider |
| 5,934,737 A | 8/1999 | Abouzahr |
| 5,941,597 A | 8/1999 | Horiuchi et al. |
| 5,984,389 A | 11/1999 | Nuber |
| 5,985,435 A | 11/1999 | Czaplicki et al. |
| 5,988,734 A | 11/1999 | Longo et al. |
| 5,992,923 A | 11/1999 | Wycech |
| 5,994,422 A | 11/1999 | Born et al. |
| 6,003,274 A | 12/1999 | Wycech |
| 6,004,425 A | 12/1999 | Born et al. |
| 6,006,484 A | 12/1999 | Geissbuhler |
| 6,022,066 A | 2/2000 | Tremblay et al. |
| 6,033,300 A | 3/2000 | Schneider |
| 6,050,630 A | 4/2000 | Hochet |
| 6,053,210 A | 4/2000 | Chapman et al. |
| 6,058,673 A | 5/2000 | Wycech |
| 6,059,342 A | 5/2000 | Kawai et al. |
| 6,068,424 A | 5/2000 | Wycech |
| 6,073,991 A | 6/2000 | Naert |
| 6,077,884 A | 6/2000 | Hess et al. |
| 6,079,180 A | 6/2000 | Wycech |
| 6,082,811 A | 7/2000 | Yoshida |
| 6,090,232 A | 7/2000 | Seeliger et al. |
| 6,092,864 A | 7/2000 | Wycech et al. |
| 6,094,798 A | 8/2000 | Seeliger et al. |
| 6,096,403 A | 8/2000 | Wycech et al. |
| 6,096,791 A | 8/2000 | Born et al. |
| 6,099,948 A | 8/2000 | Paver, Jr. |
| 6,102,379 A | 8/2000 | Ponslet et al. |
| 6,102,473 A | 8/2000 | Steininger et al. |
| 6,103,341 A | 8/2000 | Barz et al. |
| 6,103,784 A | 8/2000 | Hilborn et al. |
| 6,110,982 A | 8/2000 | Russick et al. |
| 6,129,410 A | 10/2000 | Kosaraju et al. |
| 6,131,897 A | 10/2000 | Barz et al. |
| 6,135,542 A | 10/2000 | Emmelmann et al. |
| 6,146,565 A | 11/2000 | Keller |
| 6,149,227 A | 11/2000 | Wycech |
| 6,150,428 A | 11/2000 | Hanley, IV et al. |
| 6,152,260 A | 11/2000 | Eipper et al. |
| 6,153,709 A | 11/2000 | Xiao et al. |
| 6,164,035 A | 12/2000 | Roberts |
| 6,165,588 A | 12/2000 | Wycech |
| 6,168,226 B1 | 1/2001 | Wycech |
| 6,174,932 B1 | 1/2001 | Pachl et al. |
| 6,189,953 B1 | 2/2001 | Wycech |
| 6,196,621 B1 | 3/2001 | Van Assche et al. |
| 6,197,403 B1 | 3/2001 | Brown et al. |
| 6,199,940 B1 | 3/2001 | Hopton et al. |
| 6,217,109 B1 | 4/2001 | Okana et al. |
| 6,232,433 B1 | 5/2001 | Narayan |
| 6,233,826 B1 | 5/2001 | Wycech |
| 6,237,304 B1 | 5/2001 | Wycech |
| 6,247,287 B1 | 6/2001 | Takabatake |

| | | | | | |
|---|---|---|---|---|---|
| 6,253,524 B1 | 7/2001 | Hopton et al. | WO | PCT/JP88/00029 | 1/1988 |
| 6,263,635 B1 | 7/2001 | Czaplicki | WO | PCT/AU92/00468 | 9/1992 |
| 6,270,600 B1 | 8/2001 | Wycech | WO | PCT/EP95/00896 | 3/1995 |
| 6,272,809 B1 | 8/2001 | Wycech | WO | PCT/US95/05749 | 5/1995 |
| 6,276,105 B1 | 8/2001 | Wycech | WO | PCT/US96/11155 | 7/1996 |
| 6,277,898 B1 | 8/2001 | Pachl et al. | WO | PCT/US97/10693 | 6/1997 |
| 6,281,260 B1 | 8/2001 | Hanley, IV et al. | WO | PCT/US97/07644 | 11/1997 |
| 6,287,666 B1 | 9/2001 | Wycech | WO | PCT/US97/19981 | 11/1997 |
| 6,296,298 B1 | 10/2001 | Barz | WO | WO 97/43501 | 11/1997 |
| 6,302,472 B1 | 10/2001 | Rahmstorf et al. | WO | PCT/US98/08980 | 5/1998 |
| 6,303,672 B1 | 10/2001 | Papalos et al. | WO | PCT/US98/16461 | 8/1998 |
| 6,305,136 B1 | 10/2001 | Hopton et al. | WO | PCT/US98/17994 | 9/1998 |
| 6,311,452 B1 | 11/2001 | Barz et al. | WO | PCT/US99/00035 | 1/1999 |
| 6,315,938 B1 | 11/2001 | Jandali | WO | PCT/US99/00770 | 1/1999 |
| 6,318,797 B1 | 11/2001 | Bohm et al. | WO | PCT.US98/16461 | 2/1999 |
| 6,319,964 B1 | 11/2001 | Blank et al. | WO | PCT/US99/01855 | 2/1999 |
| 6,321,793 B1 | 11/2001 | Czaplicki et al. | WO | PCT/US99/01865 | 2/1999 |
| 6,332,731 B1 | 12/2001 | Wycech | WO | PCT/US99/04263 | 3/1999 |
| 6,341,467 B1 | 1/2002 | Wycech | WO | PCT/US99/04279 | 3/1999 |
| 6,348,513 B1 | 2/2002 | Hilborn et al. | WO | PCT/CA99/00424 | 5/1999 |
| 6,358,584 B1 | 3/2002 | Czaplicki | WO | PCT/US99/10441 | 5/1999 |
| 6,368,438 B1 | 4/2002 | Chang et al. | WO | PCT/US99/11109 | 5/1999 |
| D457,120 S | 5/2002 | Broccardo et al. | WO | PCT/US99/11110 | 5/1999 |
| 6,383,610 B1 | 5/2002 | Barz et al. | WO | PCT/US99/11194 | 5/1999 |
| 2001/0017018 A1 | 8/2001 | Czaplicki | WO | PCT/US99/11195 | 5/1999 |
| 2001/0020794 A1 | 9/2001 | Ishikawa | WO | PCT/EP99/03832 | 6/1999 |
| 2001/0042353 A1 | 11/2001 | Honda et al. | WO | WO 99/28575 | 6/1999 |
| 2002/0033617 A1 | 3/2002 | Blank | WO | PCt/EP99/06112 | 8/1999 |
| 2002/0033618 A1 | 3/2002 | Kwon | WO | PCT/US99/18820 | 8/1999 |
| 2002/0054988 A1 | 5/2002 | Wycech | WO | PCT/EP99/07143 | 9/1999 |
| 2002/1053179 | 5/2002 | Wycech | WO | PCT/US99/18832 | 9/1999 |
| 2002/0074827 A1 | 6/2002 | Fitzgerald et al. | WO | WO 99/48746 | 9/1999 |
| | | | WO | PCT/US99/24795 | 10/1999 |
| | FOREIGN PATENT DOCUMENTS | | WO | PCT/DE99/04103 | 12/1999 |
| | | | WO | PCT/EP99/09541 | 12/1999 |
| DE | 9320333.0 | 6/1994 | WO | PCT/EP99/09732 | 12/1999 |
| DE | 196 35 734 A1 | 4/1997 | WO | PCT/EP99/09909 | 12/1999 |
| DE | 196 44 047 A1 | 5/1998 | WO | PCT/EP99/10151 | 12/1999 |
| DE | 196 48 164 A1 | 5/1998 | WO | PCT/US99/29986 | 12/1999 |
| DE | 198 12 288 C1 | 5/1999 | WO | PCT/US99/29987 | 12/1999 |
| DE | 197 53 658 A1 | 6/1999 | WO | PCT/US99/29990 | 12/1999 |
| DE | 299 04 705 U1 | 7/1999 | WO | PCT/US99/29991 | 12/1999 |
| DE | 198 56 255 C1 | 1/2000 | WO | PCT/US99/29992 | 12/1999 |
| DE | 198 58 903 A1 | 6/2000 | WO | PCT/US00/00010 | 1/2000 |
| EP | 82102135.9 | 3/1982 | WO | PCT/EP00/00021 | 1/2000 |
| EP | 90202150.0 | 8/1990 | WO | PCT/US00/00497 | 1/2000 |
| EP | 91104546.6 | 3/1991 | WO | PCT/US00/01644 | 1/2000 |
| EP | 94101343.5 | 1/1994 | WO | WO 00/03894 | 1/2000 |
| EP | 95913082.4 | 3/1995 | WO | PCT/EP00/01474 | 2/2000 |
| EP | 0 679 501 A1 | 11/1995 | WO | PCT/AT00/00123 | 5/2000 |
| EP | 0 775 721 A1 | 5/1997 | WO | WO 00/37302 | 6/2000 |
| EP | 0 891 918 A1 | 1/1999 | WO | WO 00/55444 | 9/2000 |
| EP | 0 893 331 A1 | 1/1999 | WO | WO 01/54936 | 8/2001 |
| EP | 0 893 332 A1 | 1/1999 | WO | WO 01/56845 | 8/2001 |
| EP | 1 122 156 A2 | 8/2001 | WO | WO 01/57130 | 8/2001 |
| EP | 0 893 332 B1 | 3/2002 | WO | WO 01/71225 | 9/2001 |
| FR | 2 539 693 | 1/1983 | WO | WO 01/83206 | 11/2001 |
| FR | 2 749 263 | 5/1996 | WO | PCT/US00/02631 | 2/2002 |
| FR | 2 749 263 | 12/1997 | | | |
| GB | 628863 | 3/1947 | | OTHER PUBLICATIONS | |
| GB | 8028960 | 9/1980 | | | |
| GB | 2 156 412 A | 10/1985 | | | |
| GB | 8725028 | 10/1987 | | | |
| JP | 61118211 | 6/1986 | | | |
| JP | 64-69308 | 3/1989 | | | |
| JP | 64-69309 | 3/1989 | | | |
| JP | 01164867 | 6/1989 | | | |
| JP | 2-206537 | 8/1990 | | | |
| JP | 5-38992 | 2/1993 | | | |
| JP | 2001191947 | 7/2001 | | | |
| JP | 02001191949 A | 7/2001 | | | |
| WO | WO 87/01978 | 4/1987 | | | |

Co-pending Application Serial No. 09/460,322; filed Dec. 10, 1999.

Co-pending Application Ser. No. 09/459,756; filed Dec. 10, 1999.

Co-pending Application Ser. No. 09/524,298; filed Mar. 14, 2000.

Co-pending Application Ser. No. 09/502,686; filed Feb. 11, 2000.

Co-pending Application Ser. No. 09/631,211; filed Aug. 3, 2000.

Co-pending Application Ser. No. 09/676,443; filed Sep. 29, 2000.

Co-pending application Ser. No. 09/676,725; filed Sep. 29, 2000.

Copending U.S. patent application Ser. No. 09/655,965 filed Sep. 6, 2000.

Copending U.S. patent application Ser. No. 09/858,939 filed May 16, 2001.

Copending U.S. patent application Ser. No. 09/859,126 filed May 16, 2001.

Copending U.S. patent application Ser. No. 09/906,289 filed Jul. 16, 2001.

Copending U.S. patent application Ser. No. 09/923,138 filed Aug. 6, 2001.

Copending U.S. patent application Ser. No. 09/939,152 filed Aug. 24, 2001.

Copending U.S. patent application Ser. No. 09/939,245 filed Aug. 24, 2001.

Copending U.S. patent application Ser. No. 09/974,017 filed Oct. 10, 2001.

Copending U.S. patent application Ser. No. 09/982,681 filed Oct. 18, 2001.

Copending U.S. patent application Ser. No. 60/296,312 filed Jun. 6, 2001.

Copending U.S. patent application Ser. No. 60/317,009 filed Sep. 4, 2001.

PCT Search Report dated Feb. 20, 2002.

International Preliminary Examination Report dated Apr. 3, 2002.

HYDROFORM STRUCTURAL REINFORCEMENT SYSTEM

This is a Continuation of application Ser. No. 09/676,335, filed Sep. 29, 2000.

FIELD OF THE INVENTION

The present invention relates generally to a structural reinforcement system for use in increasing the stiffness, strength, or durability of different portions of automotive or aerospace vehicles. More particularly, the present invention relates to structurally reinforced closed forms, such as a hydroform structure or hydroform rail, which utilizes an expandable and foamable material to cross-link, structurally adhere, and reinforce the form when the foamable material becomes chemically active and expands upon heating.

BACKGROUND OF THE INVENTION

Traditionally, closed form or hydroforming techniques are used to draw and shape metal tubes. Conventional hydroforming techniques often involve two steps: (1) placing the desired bends in the tube and (2) forming the tube to the desired configuration. Step 2 of this process usually requires placing a tubular member having an open bore in a mold and pinching off the ends of the tube. A pressurized liquid is then injected into the open bore, causing the tube to stretch and expand out against the mold.

The manufacturing advantages of the hydroforming process is that it allows formation of relatively long tubular structures having a seamless perimeter. This process eliminates the cost of welding, machining, or fastening operations often used to shape the part in the desired configuration. As a result, a hydroform or closed form structure very often has a high length to diameter ratio. For instance, a hydroform structure may have a length in excess of 15' and a diameter ranging from approximately ¾" to more than 12". To this end, a further manufacturing process advantage of a hydroform structure is that it can exceed the length of other tubular members, such as torsion bars or tubular bars, formed using other processes.

Additionally, hydroforming processing creates complex structural shapes that typically include bends and contour changes. Often the number of bends and contour changes in a hydroformed bar are greater and more complex than those found in torsion bars or other tubular structures formed using different techniques.

Hydroform structures typically have a constant wall thickness prior to forming, and might develop strength differences at the site of bends or changes in contour, as well as at certain locations along a long tubular section. Thus, it is often desirable to reinforce closed form and hydroform sections to improve their structural stiffness, strength, and durability, particularly in automotive vehicle applications.

Traditional ways of reinforcing tubular structures such as hydroforms and other closed forms include sliding a metal sleeve inside the tube and welding the reinforcing member in place. However, because the hydroform often includes one or more bends or one or more changes in contour and/or diameter, it is often difficult to insert the sleeve into the hydroform at the precise location of the weak portion. Other techniques include reinforcing the hydroform from the outside by welding the sleeve onto the outside of the hydroform. However, hydroforms are often used in applications having very close tolerances, resulting in little or no clearance for an externally placed reinforcing member. Accordingly, exterior reinforcements are often not as effective as interior reinforcements.

Additionally, in many operations the weight of the tubular member is critical and must be kept low as possible. Thus, the use of an external sleeve adds unwanted weight to the tubular assembly. Still further, the welding operation tends to be labor intensive, time consuming and inexact, increasing the cost of forming the hydroform member and producing parts that have questionable reliability. Finally, these additional manufacturing steps and operations are often cumbersome and difficult to integrate into a final vehicle manufacturing process in that additional tooling would need to be developed by the manufacturer and assembly plant resources, labor, maintenance, and space would need to be dedicated and expensed by the vehicle manufacturer.

Accordingly, there is a need in industry and manufacturing operations for system, device, and method for reinforcing the weak areas of closed forms and other hydroform tubes without significantly increasing the weight and manufacturing complexity. In particular, there is a need for reinforcing a closed form or hydroform, which utilizes a plurality of members or pieces to achieve integrated reinforcement within the closed form since the contour or shape of typical tubes do not allow for placement of single piece reinforcement members. In this regard, the present invention addresses and overcomes the shortcomings found in the prior art by providing a multi-piece reinforcement system having at least two members capable of being nested together within a hydroform that may then be fixed in location through the use of a third member which serves as a locking and positioning member of the reinforcement system within the hydroform or other closed form. However, design of two nesting member could also create a lock mechanism. Structural reinforcement of the hydroform is achieved through activation by heat of an adhesive material disposed along at least two of the members, such a material would typically expand to contact a substrate surface and in doing so structurally adhere the multiple members to each other and the hydroform.

SUMMARY OF THE INVENTION

The invention relates to methods and systems for reinforcing a closed form or hydroform member. In one embodiment, the hydroform member includes an outer structural member having an open bore; and an expandable material or structural foam supported by the outer structural member. The expandable material extends along at least a portion of the length of the outer structural member, and may fill at least a portion of the length of the bore.

The expandable material is generally and preferably a heat-activated epoxy-based resin having foamable characteristics upon activation through the use of heat typically encountered in an e-coat or other automotive painting operation. As the foam is heated, it expands, cross-links, and structurally adheres to adjacent surfaces. Preferred structural foam materials are commercially available from L&L Products, Inc. of Romeo, Mich. under the designation L5204, L5206, L5207, L5208, or L5209. Generally speaking, these automotive vehicle applications may utilize technology and processes such as those disclosed in U.S. Pat. Nos. 4,922,596, 4,978,562, 5,124,186, and 5,884,960 and commonly owned, co-pending U.S. patent application Ser. No. 09/502,686 filed Feb. 11, 2000, Ser. No. 09/524,961 filed Mar. 14, 2000, and particularly, Ser. No. 09/459,756 filed Dec. 10, 1999, all of which are expressly incorporated by reference.

The system generally employs two or more members adapted for stiffening the structure to be reinforced and helping to redirect applied loads. In use, the members are inserted into a closed form, such as a hydroformed tube, with the heat activated bonding material serving as the load transferring and potentially energy absorbing medium. In a particularly preferred embodiment, at least two of the composite members are composed of an injection molded nylon carrier, an injection molded polymer, or a molded metal (such as aluminum, magnesium, and titanium, an alloy derived from the metals or a metallic foam derived from these metals or other metal foam) and it is at least partially coated with a bonding material on at least one of its sides, and in some instances on four or more sides. A preferred bonding medium is an epoxy-based resin, such as L5204, L5206, L5207, L5208 or L5209 structural foam commercially available from L & L Products, Inc. of Romeo, Mich. However, the third member which serves to lock and position the first two members could also utilize an adhesive material along its outer surface. In addition, it is contemplated that the member could comprise a nylon or other polymeric material as set forth in commonly owned U.S. Pat. No. 6,103,341, expressly incorporated by reference herein. Still further, the member adapted for stiffening the structure to be reinforced could comprise a stamped and formed cold-rolled steel, a stamped and formed high strength low alloy steel, a stamped and formed transformation induced plasticity (TRIP) steel, a roll formed cold rolled steel, a roll formed high strength low alloy steel, or a roll formed transformation induced plasticity (TRIP) steel. In essence, any material that is considered structural may be used in conjunction with the structural foam. The choice of the structural material used in conjunction with a structural foam or other bonding medium will be dictated by performance requirements and economics of a specific application.

Additional foamable or expandable materials that could be utilized in the present invention include other materials which are suitable as bonding or acoustic media and which may be heat activated foams which generally activate and expand to fill a desired cavity or occupy a desired space or function when exposed to temperatures typically encountered in automotive e-coat curing ovens and other paint operations ovens. Though other heat-activated materials are possible, a preferred heat activated material is an expandable or flowable polymeric formulation, and preferably one that can activate to foam, flow, adhere, or otherwise change states when exposed to the heating operation of a typical automotive assembly painting operation. For example, without limitation, in one embodiment, the polymeric foam is based on ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foam formulation that are commercially available include polymer-based material commercially available from L&L Products, Inc. of Romeo, Mich., under the designations as L-2105, L-2100, L-7005 or L-2018, L-7101, L7102, L-2411, L-2420, L-4141, etc. and may comprise either open or closed cell polymeric base material.

Further, it is contemplated that if an acoustic material is used in conjunction with the present invention, when activated through the application of heat, it can also assist in the reduction of vibration and noise in the overall automotive body. In this regard, the now reinforced closed form or hydroform will have increased stiffness in the cross-members, which will reduce the natural frequency, measured in hertz that resonates through the automotive chassis and reduced acoustic transmission and the ability to block or absorb noise through the use of the conjunctive acoustic product. By increasing the stiffness and rigidity of the cross-members, the noise and frequency of the overall engine ride vibration that occurs from the operation of the vehicle can be reduced since a reduced frequency of noise and vibration will resonate through the chassis. Although the use of such vibration reducing materials or media can be utilized instead of, or in conjunction with, the structural expandable material, the preferred embodiment of the structural reinforcement system of the present invention utilizes the structurally reinforcing expandable material. Use of acoustic materials in conjunction with structural may provide additional structural improvement but primarily would be incorporated to improve NV H characteristics.

It is also contemplated that foamable or expandable material could be delivered and placed into contact with the member or hydroform, such as hydroform tube found in automotive applications, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with heat-activated polymer that could be structural or acoustic in nature. This preferably heat activated material can be snap-fit onto the chosen surface or substrate; placed into beads or pellets for placement along the chosen substrate or member by means of extrusion; placed along the substrate through the use of baffle technology; a die-cutting operation according to teachings that are well known in the art; pumpable application systems which could include the use of a baffle and bladder system; and sprayable applications.

In one embodiment, at least two members composed of an injection molded nylon are provided with a suitable amount of bonding or load transfer medium molded onto its sides in at least one location wherein each portion is smaller in diameter than a corresponding insertable opening in the form or tube to enable placement within a cavity defined within an automotive vehicle, such as portions of a hydroform tube section or other area or substrate found in an automotive vehicle which could benefit from the structural reinforcement characteristics found in the present invention. In this embodiment, a first portion corresponds to, and is insertably attached to an opening located within a lower portion of the hydroform tube section. A second portion is slideably engaged and affixed to an upper surface of the first portion. A third portion is then utilized to fixedly bridge the first and second portions together within the hydroform tube. It is contemplated that the bonding medium could be applied to a substrate in a variety of patterns, shapes, and thicknesses to accommodate the particular size, shape, and dimensions of the cavity corresponding to the chosen form or vehicle application. The expandable material or bonding medium is activated to accomplish expansion through the application of heat typically encountered in an automotive e-coat oven or other painting operation oven in the space defined between the plurality of members and the walls of the hydroform tube defining the cavity. The resulting structure includes the wall structure of the hydroform tube joined to the plurality of members with the aid of the structural foam.

BRIEF DESCRIPTION OF THE DRAWINGS

The features and inventive aspects of the present invention will become more apparent upon reading the following detailed description, claims and drawings, of which the following is a brief description:

DESCRIPTION OF THE PREFERRED EMBODIMENT

Figure 1:
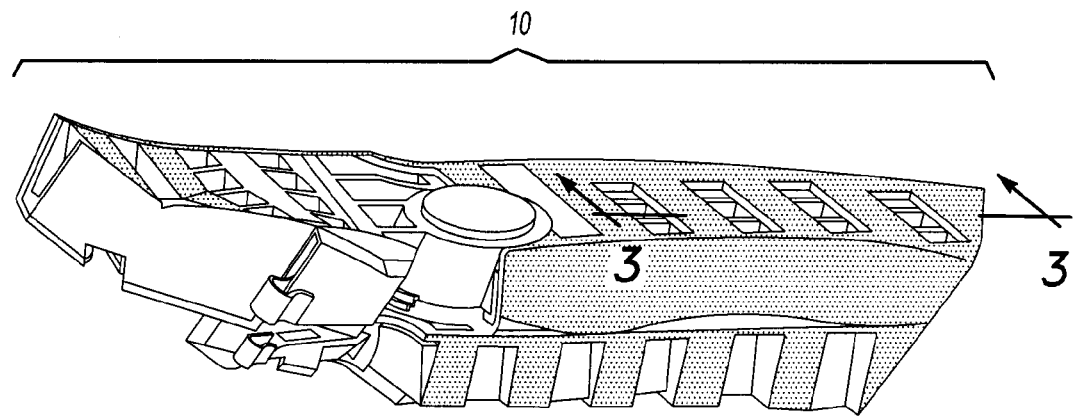
FIG. 1 is a perspective view of a hydroform structural reinforcement system in accordance with the teachings of the present invention.

FIG. 1 shows a reinforced hydroform system 10 formed in accordance with the teachings of the present invention. The hydroform reinforcement system 10 imparts increased strength, stiffness, or durability to a structural member, and, thus, may be used in a variety of applications. For instance, the reinforced hydroform system 10 may be used as part of the frame or rail system for automobiles or building structures.

Figure 2:
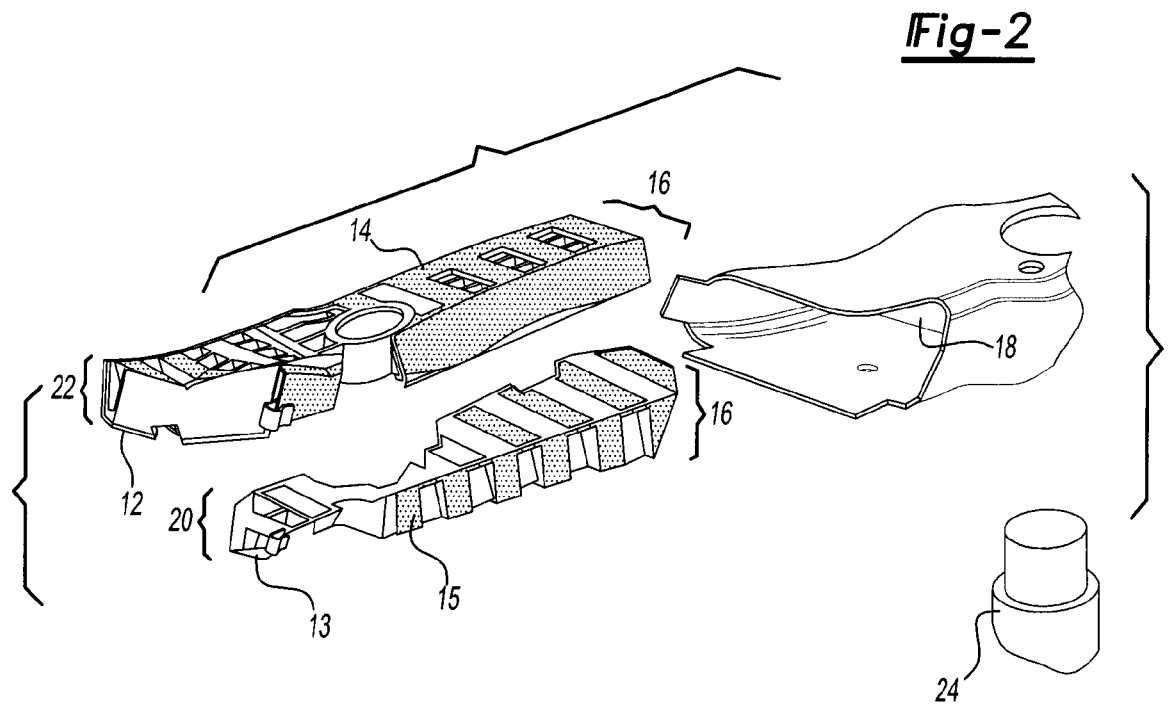
FIG. 2 is an exploded section view of a portion of a hydroform tube described in FIG. 1, showing the position of the plurality of members and the expandable material in the uncured state.

In a preferred embodiment, as in FIG. 2, the present invention comprises at least two members 12, 13 composed of an injection molded polymer are provided with a suitable amount of an expandable material or load transfer medium 14, 15 molded on its sides perhaps in a plurality of portions 16 wherein each portion 16 is smaller in diameter than a corresponding insertable opening in the form or tube 18, for placement within a cavity defined within an automotive vehicle, such as portions of a hydroform tube section or other area or substrate found in an automotive vehicle which could benefit from the structural reinforcement characteristics found in the present invention. In this embodiment, a first portion 20 corresponds to, and is insertably attached to an opening located within a lower portion of the hydroform tube section. A second portion 22 is slideably engaged and affixed to an upper surface of the first portion. A third portion 24 is then utilized to fixedly bridge the first 20 and second 22 portions together within the hydroform tube. It is contemplated that the bonding medium 14, 15 could be applied to a substrate in a variety of patterns, shapes, and thicknesses to accommodate the particular size, shape, and dimensions of the cavity corresponding to the chosen form or vehicle application. The expandable material or bonding medium 14, 15 is activated to accomplish expansion through the application of heat typically encountered in an automotive e-coat oven or other heating operation in the space defined between the plurality of members and the walls of the hydroform tube defining the cavity. The resulting structure includes the wall structure of the hydroform tube joined to the plurality of members with the aid of the structural foam.

In this preferred embodiment, the first 20 and second 22 portions are nested together within the hydroform tube 18 with each having an application of the expandable material or bonding medium 14, 15. The third portion 24 is then insertably engaged through the hydroform tube 18 as shown in FIG. 2 to serve as a locking and positioning member of the reinforcement system within the hydroform or other closed form. Structural reinforcement of the hydroform tube 18 is achieved through activation by heat or some other activation stimulus applied to the structural material 14, 15 disposed along at least first 20 and second 22 portions wherein the structural material 14, 15 may expand and will structurally adhere the first 20, second 22, and third 24 portions to each other and the hydroform tube 18.

It is contemplated that the structural material or bonding material 14, 15 comprises a structural foam, which is preferably heat-activated and expands and cures upon heating, typically accomplished by gas release foaming coupled with a cross-linking chemical reaction. This structural foam is generally applied to the members 12, 13 in a solid or semi-solid state. The structural foam may be applied to the outer surface of the members 12, 13 in a fluid state using commonly known manufacturing techniques, wherein the structural foam is heated to a temperature that permits the structural foam to flow slightly to aid in substrate wetting. Upon curing the structural foam hardens and adheres to the outer surface of the member 12, 13. Alternatively, the structural foam may be applied to the members 12, 13 as precast pellets, which are heated slightly to permit the pellets to bond to the outer surface of the members 12, 13. At this stage, the structural foam is heated just enough to cause the structural foam to flow slightly, but not enough to cause the structural foam to thermally expand. Additionally, the structural foam may also be applied by heat bonding/thermoforming or by co-extrusion. Note that other stimuli activated materials capable of bonding can be used, such as, without limitation, an encapsulated mixture of materials that, when activated by temperature, pressure, chemically, or other by other ambient conditions, will become chemically active. To this end, one aspect of the present invention is to facilitate a streamlined manufacturing process whereby the bonding material 14, 15 can be placed along the members 12 in a desired configuration and inserted within the closed form or hydroform at a point before final assembly of the vehicle.

The bonding material that may have foamable characteristics is generally an epoxy-based material, but may include an ethylene copolymer or terpolymer, such as with an alpha-olefin. As a copolymer or terpolymer, the molecule is composed of two or three different monomers, i.e., small molecules with high chemical reactivity that are capable of linking up with similar molecules.

A number of epoxy-based structural reinforcing foams are known in the art and may also be used to produce the bonding material 14 of the present invention. A typical structural foam includes a polymeric base material, such as an epoxy resin or ethylene-based polymer which, when compounded with appropriate ingredients (typically a blowing agent and perhaps a curing agent and filler), typically expands and cures in a reliable and predictable manner upon the application of heat or another activation stimulus. The resulting material has a low density and sufficient stiffness to impart desired rigidity to a supported article. From a chemical standpoint for a thermally-activated material, the structural foam is usually initially processed as a thermoplastic material before curing. After curing, the structural foam typically becomes a thermoset material that is fixed and incapable of flowing.

An example of a preferred structural foam formulation is an epoxy-based material that may include polymer modificis such as an ethylene copolymer or terpolymer that is commercially available from L&L Products, Inc. of Romeo, Mich., under the designations L5206, L5207, L5208 and L5209. One advantage of the preferred structural foam materials over prior art materials is the preferred materials can be processed in several ways. Possible processing techniques for the preferred materials include injection molding, extrusion or extrusion with a mini-applicator extruder. This enables the creation of part designs that exceed the capability of most prior art materials.

While the preferred materials for fabricating the bonding material 14 have been disclosed, the material 14 can be formed of other materials provided that the material selected is heat-activated or otherwise activated by an ambient condition (e.g. moisture, pressure, time or the like) and expands in a predictable and reliable manner under appropriate conditions for the selected application. One such material is the epoxy based resin disclosed in U.S. patent application Ser. No. 09/268,810, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, polyurethane materials with high glass transition temperatures, and mixtures or composites that may include even metallic foams such as an aluminum foam composition. See also, U.S. Pat. Nos. 5,766,719; 5,755,486; 5,575,526; 5,932,680 (incorporated herein by reference). In general, the desired characteristics of the structural foam 16 include high stiffness, high strength, high glass transition temperature (typically greater than 70 degrees Celsius), and good adhesion retention, particularly in the presence of corrosive or high humidity environments.

In applications where a heat activated, thermally expanding material is employed, an important consideration involved with the selection and formulation of the material comprising the structural foam is the temperature at which a material reaction or expansion, and possibly curing, will take place. For instance, in most applications, it is undesirable for the material to be active at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels. While temperatures encountered in an automobile assembly body shop ovens may be in the range of 148.89° C. to 204.44° C. (300° F. to 400° F.), and paint shop oven temps are commonly about 93.33° C. (215° F.) or higher. If needed, blowing agents activators can be incorporated into the composition to cause expansion at different temperatures outside the above ranges.

Generally, prior art expandable acoustic foams have a range of expansion ranging from approximately 100 to over 1000 percent. The level of expansion of the structural foam 16 may be increased to as high as 1500 percent or more, but is typically between 0% and 300%. In general, higher expansion will produce materials with lower strength and stiffness.

The hydroform reinforcement system 10 disclosed in the present invention may be used in a variety of applications where structural reinforcement is desired. The hydroform system 10 has particular application in those instances where the overall weight of the structure being reinforced is a critical factor. For instance, the hydroform system 10 may be used to increase the structural strength of aircraft frames, marine vehicles, automobile frames, building structures or other similar objects. In the embodiment disclosed the hydroform system 10 is used as part of an automobile frame to reinforce selected areas of the automobile frame or rails, and may also be utilized in conjunction with rockers, cross-members, chassis engine cradles, radiator/rad supports, and door impact bars in automotive vehicles.

Figure 3:
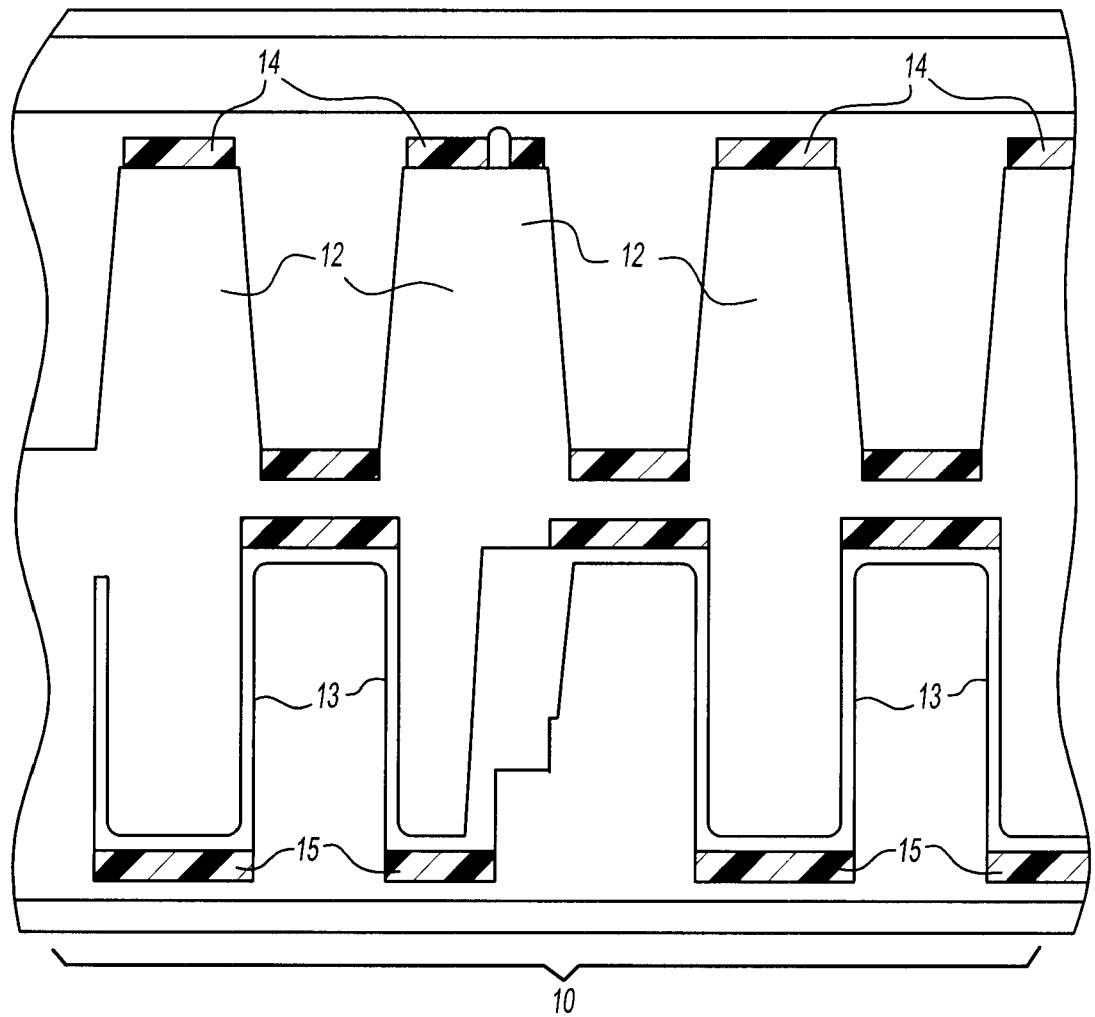
FIG. 3 is a cutaway sectional view of a hydroform structural reinforcement system in accordance with the teachings of the present invention showing the plurality of members one of the members comprising the hydroform structural reinforcement system of the present invention.

As best illustrated in FIGS. 2 and 3, the hydroform reinforcement system 10 is suitable for placement within a frame portion of an automobile frame assembly. At least two members 12 composed of an injection molded polymer (or other material (e.g., metal) or composite) are provided with a suitable amount of an expandable material or load transfer medium 14 molded on its sides in a plurality of portions 16 wherein each portion 16 is smaller in diameter than a corresponding insertable opening in the form or tube 18, for placement within a cavity defined within an automotive vehicle, such as portions of a hydroform tube section or other area or substrate found in an automotive vehicle which could benefit from the structural reinforcement characteristics found in the present invention. In this embodiment, a first portion 20 corresponds to, and is insertably attached to an opening located within a lower portion of the hydroform tube section. A second portion 22 is slideably engaged and affixed to an upper surface of the first portion. A third portion 24 is then utilized to fixedly bridge the first 20 and second 22 portions together within the hydroform tube. It will be appreciated that the hydroform reinforcement system 10 of the present invention may be used to reinforce other areas of an automobile frame or rocker assembly and the number of members 12 and placement of the expandable material 14 along the members 12 would be dictated by the shape and desired application.

Though other heat activated materials are possible, a preferred heat activated material is an expandable polymeric material, and preferably one that is foamable. A particularly preferred material is an epoxy-based structural foam. For example, without limitation, in one embodiment, the structural foam is an epoxy-based material that may include an ethylene copolymer or terpolymer.

A number of epoxy-based structural reinforcing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

Some other possible materials include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively high glass transition point, and good environmental degradation resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the material 14 is provided in an encapsulated or partially encapsulated form, which may comprise a pellet, which includes an expandable foamable material, encapsulated or partially encapsulated in an adhesive shell, which could then be attached to the members 12 in a desired configuration. An example of one such system is disclosed in commonly owned, co-pending U.S. application Ser. No. 09/524,298 ("Expandable Pre-Formed Plug"), hereby incorporated by reference. In addition, as discussed previously, preformed patterns may also be employed such as those made by extruding a sheet (having a flat or contoured surface) and then die cutting it according to a predetermined configuration.

The skilled artisan will appreciate that the system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

A number of advantages are realized in accordance with the present invention, including, but not limited to, the ability to manufacture a structural reinforcement system for use in a hydroform or other closed form for delivery and assembly at a vehicle assembly plant without the need for application of pumpable products, wet chemical products, and multiple sets of tools, such as for other prior art.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A system having a hydroformed structural member of an automotive vehicle and portions for reinforcing the hydroformed structural member, the system comprising:
   (a) a hydroformed tube;
   (b) a first portion that includes a first member and an expandable material molded upon the first member, the first portion also including an upper surface and the first portion being configured for insertion into the hydroformed tube; and
   (c) a second portion that includes a second member and an expandable material molded upon the second member, the second portion configured to be affixed to the upper surface of the first portion while in the hydroformed tube;
   wherein,
   i) the first portion is placed within the hydroformed tube followed by placement of the second portion within the hydroformed tube;
   ii) the first portion nests with the second portion upon placement of the first portion and the second portion into the tube thereby locking the first portion to the second portion together; and
   iii) the expandable material of the first portion and second portion expands to fixedly position the first portion and second portion within the hydroformed tube.

2. The system as claimed in claim 1, wherein the first member and the second member are comprised of a stamped and formed cold rolled steel.

3. The system as claimed in claim 1, wherein the first member and the second member are comprised of a stamped and formed high strength low alloy steel.

4. The system as claimed in claim 1, wherein the first member and the second member are comprised of a stamped and formed transformation induced plasticity steel.

5. The system as claimed in claim 1, wherein the first member and the second member are comprised of a roll formed cold rolled steel.

6. The system as claimed in claim 1, wherein the first member and the second member are comprised of a roll formed high strength low alloy steel.

7. The system as claimed in claim 1, wherein the first member and the second member are comprised of a roll formed transformation induced plasticity steel.

8. The system as claimed in claim 1, wherein the first member and the second member are comprised of a molded plastic.

9. The system as claimed in claim 1, wherein the expandable material of the first portion and the second portion is a polymeric material.

10. The system as claimed in claim 1, wherein the expandable material of the first portion and the second portion is a polymeric material having foamable characteristics.

11. The system as claimed in claim 1, wherein the expandable material of the first portion and the second portion is an epoxy-based polymer having foamable characteristics.

12. The system as claimed in claim 1, wherein the expandable material of the first portion and the second portion is a heat activated expandable polymer foam.

13. The system as claimed in claim 1, wherein the expandable material of the first portion and the second portion is an expandable foam that is generally free of tack to the touch.

14. The system as claimed in claim 1, wherein the expandable material of the first portion and the second portion is an expandable polymeric material having foamable characteristics that can be activated at a temperature encountered in an automotive vehicle paint operation ovens.

15. The system as claimed in claim 1, wherein the expandable material of the first portion and second portion is applied to the first member and the second member with a mini-applicator.

16. A system having a hydroformed structural member of an automotive vehicle and portions for reinforcing the hydroformed structural member, the system comprising:

(a) a hydroformed tube that is part of a frame of the automotive vehicle;

(b) a first portion that includes a first member and an expandable material molded upon the first member, the first portion also including an upper surface and the first portion being configured for insertion into the hydroformed tube, the first member being formed of a molded plastic and having a plurality of ribs; and (c) a second portion that includes a second member and an expandable material molded upon the second member, the second portion configured to be affixed to the upper surface of the first portion while in the hydroformed tube, the second member being formed of a molded plastic and having a plurality of ribs;

wherein,
i) the first portion is placed within the hydroformed tube followed by placement of the second portion within the hydroformed tube;
ii) the first portion nests with the second portion upon placement of the first portion and the second portion into the tube thereby locking the first portion to the second portion together; and
iii) the expandable material of the first portion and second portion expands to structurally adhere the first and second portions together and to fixedly position the first and second portions within the hydroformed tube.

17. The system as claimed in claim 16, wherein the expandable material of the first portion and the second portion is a heat activated expandable polymer foam.

18. The system as claimed in claim 16, wherein the expandable material of the first portion and the second portion is an expandable foam that is generally free of tack to the touch.

19. The system as claimed in claim 16, wherein the expandable material of the first portion and the second portion is an expandable polymeric material having foamable characteristics that can be activated at a temperature encountered in an automotive vehicle paint operation ovens.

20. The system as claimed in claim 19, wherein the expandable material of the first portion and second portion is applied to the first member and the second member with a mini-applicator.

* * * * *